United States Patent
Adamson

[19]

[11] Patent Number: 5,805,656
[45] Date of Patent: Sep. 8, 1998

[54] FUEL CHANNEL AND FABRICATION METHOD THEREFOR

[75] Inventor: Ronald B. Adamson, Alameda, Calif.

[73] Assignee: General Electric Company, Schenectady, N.Y.

[21] Appl. No.: 629,209

[22] Filed: Apr. 8, 1996

[51] Int. Cl.[6] .................................................. G21C 3/07
[52] U.S. Cl. .......................... 376/416; 376/260; 376/457
[58] Field of Search ................................. 376/409, 414, 376/416, 260, 457, 442, 443; 420/422

[56] References Cited

U.S. PATENT DOCUMENTS

| | | | |
|---|---|---|---|
| 4,649,023 | 3/1987 | Sabol et al. | 420/423 |
| 5,225,154 | 7/1993 | Kanno et al. | 376/416 |
| 5,361,282 | 11/1994 | Adamson et al. | 376/443 |
| 5,493,592 | 2/1996 | Garzarolli et al. | 376/416 |
| 5,517,541 | 5/1996 | Rosenbaum et al. | 376/416 X |
| 5,524,032 | 6/1996 | Adamson et al. | 376/409 |

FOREIGN PATENT DOCUMENTS

| | | | |
|---|---|---|---|
| 0533186 | 3/1993 | European Pat. Off. | 376/442 |
| 3703168 | 10/1987 | Germany | 376/442 |
| 014316 | 3/1988 | Japan | 376/416 |

*Primary Examiner*—Charles T. Jordan
*Assistant Examiner*—Matthew J. Lattig

[57] ABSTRACT

A composite zirconium alloy component that exhibits a reduced propensity for irradiation growth and enhanced corrosion resistance when in a radiation field. The component is formed to have an inner core and two oppositely-disposed outer layers that are metallurgically bonded to the inner core. The inner core and the outer layers are formed from two different zirconium alloys, with the inner core alloy contributing to the ability of the component to resist dimensional distortions as a result of irradiation growth, while the outer layer alloy contributes to the ability of the component to resist corrosion. As such, the alloys are combined within the component in a manner that exploits the different corrosion and irradiation-resistance properties of the alloys.

20 Claims, 1 Drawing Sheet

FUEL CHANNEL AND FABRICATION METHOD THEREFOR

The present invention generally relates to fuel channels for use in nuclear reactor cores. More particularly, this invention relates to a composition and fabrication process for a fuel channel of the type used in boiling water reactors, in which the composition and fabrication process yield a channel that exhibits improved resistance to bow, creep and corrosion.

BACKGROUND OF THE INVENTION

The service life of a boiling water reactor (BWR) fuel channel is generally limited by the ability of the channel to resist longitudinal bowing, creep and corrosion. Channels used in the nuclear energy industry are typically formed from the zirconium alloys Zircaloy-2 and Zircaloy-4, which exhibit exceptional resistance to corrosion resistance due to a natural formation of a dense, adherent and stable surface oxide. However, such zirconium alloys are susceptible to longitudinal bowing as a result of their irradiation growth properties. Specifically, neutron irradiation causes an increase in the length (growth) of a zirconium-based alloy in the direction coincident with the rolling direction of a component fabricated from the alloy. This phenomenon is well known and has been documented in the art to be a strong function of fast neutron fluence, a gradient of which is present transversely through a channel as a result of there being a higher fast neutron flux level at the center of the core than at the perimeter of the core. Accordingly, there is a tendency for one side of a fuel channel to lengthen or "grow" more than the opposite side of the channel, such that the channel will exhibit a measurable longitudinal bow over time. While the presence alone of longitudinal bow does not significantly influence the mechanical properties of the channel, a sufficient degree of bowing can cause the channel to interfere with the free movement of its adjacent control blade, which must be capable of being stroked relative to the channel in order to control the nuclear reaction. Eventually, a channel will bow sufficiently to necessitate its replacement.

A method for reducing the tendency for a zirconium alloy fuel channel to bow is to metallurgically treat the zirconium alloy to reduce its propensity for irradiation growth. One such method is taught in U.S. Pat. No. 5,361,282 to Adamson et al., and entails the combined steps of heat treating, warm forming and thermal sizing a Zircaloy alloy to yield a fuel channel that exhibits reduced residual stress and reduced irradiation growth. Another method for reducing channel bow is to appropriately alloy zirconium to reduce its propensity for irradiation growth. One class of zirconium alloys that has achieved success has an approximate composition of, in weight percent, about 1.0 tin, about 1.0 niobium, and about 0.3 iron, with the balance essentially zirconium and incidental impurities (Zr1.0Sn1.0Nb0.3Fe). This class of alloys, referred to as Alloy 625, was first developed in the former U.S.S.R. for use in its nuclear power program, and was claimed to have exceptional resistance to irradiation growth and creep for a zirconium-based alloy. Variations of this class of alloy include a composition employed by the General Electric Company under the name NSF, with a composition of, in weight percent, about 0.5 to about 1.0 tin, about 0.6 to 1.0 niobium, and about 0.2 to about 0.5 iron, with the balance essentially zirconium and incidental impurities. Yet another variation of the Zr1.0Sn1.0Nb0.3Fe alloy is employed by the Westinghouse Electric Corporation under the name ZIRLO, but with an iron content of about 0.1 weight percent as taught in U.S. Pat. No. 4,649,023 to Sabol et al. The ZIRLO alloy was described as being primarily developed for use as fuel cladding in pressurized water reactors (PWR), and as exhibiting enhanced corrosion resistance in a PWR environment as compared to the Zircaloy-4 alloy. However, as is well known in the industry, the corrosion resistance of a zirconium alloy is dependent on the type of reactor environment in which it is used, and that the relative corrosion resistance of a particular alloy composition within a given environment cannot be accurately predicted based on its composition. In the case of the Zr1.0Sn1.0Nb0.3Fe alloys, testing has indicated that these alloys generally have a lower resistance to corrosion than the Zircaloy alloys when employed in a boiling water reactor (BWR) environment.

While the zirconium alloys and their processes have provided advances in resistance to corrosion and longitudinal bowing, further improvements are desired to yield nuclear reactor components, such as fuel channels, that are capable of a longer service life, particularly in a boiling water reactor.

SUMMARY OF THE INVENTION

It is an object of this invention to provide a composition for a nuclear reactor core component that exhibits reduced susceptibility to dimensional distortions as a result of irradiation growth.

It is a further object of this invention that such a composition entails a composite structure of two different zirconium alloys that are combined in a manner that exploits their individual beneficial properties.

It is another object of this invention that such a composition is amenable to fabrication processes capable of promoting the resistance of the composite structure to irradiation growth.

In accordance with a preferred embodiment of this invention, these and other objects and advantages are accomplished as follows.

According to the present invention, there is provided a composite zirconium alloy component that exhibits a reduced propensity for irradiation growth when present in a neutron radiation field, as is the case with fuel channels used in the core of a boiling water reactor. The component is a composite in the sense that it is composed of different zirconium alloys that are combined in a manner that exploits the corrosion and irradiation-resistance properties of the different alloys. This invention further entails a fabrication process by which the desired mechanical and corrosion-resistance properties of the component are further promoted.

According to this invention, the component is formed to have a core and at least one cladding layer that is metallurgically bonded to the core. In the case of a fuel channel for a reactor core, the core is an inner core and the cladding preferably comprises two oppositely-disposed outer layers that are metallurgically bonded to the inner core. The inner core and the outer layers are formed from two different zirconium alloys, with the inner core alloy contributing to the ability of the component to resist dimensional distortions as a result of irradiation growth, while the outer layer alloy contributes to the ability of the component to resist corrosion.

A suitable alloy for the inner core is the NSF zirconium alloy developed by the General Electric Company having a composition, in weight percent, of about 0.6 to about 1.0 niobium, about 0.5 to about 1.0 tin, and about 0.2 to about 0.5 iron, with the balance essentially zirconium and incidental impurities. In contrast, the outer layers are formed from a corrosion resistant alloy such as Zircaloy-2, having a composition, in weight percent, of about 1.2 to 1.7 tin, about 0.10 to 0.18 iron, about 0.08 to 0.12 chromium, about 0.04 to 0.08 nickel, about 0.04 to 0.14 silicon, and about 0.08 to 0.14 oxygen, with the balance zirconium and incidental impurities. The invention also encompasses outer layers formed from zirconium-based alloys having lower tin contents and/or higher iron and nickel contents than that noted above for Zircaloy-2. According to the invention, the alloy of the outer layers is processed in a manner that yields a more corrosion-resistant microstructure.

The composition of the outer layers can be alloyed to further include, in weight percent, about 0.02 to about 0.2 of a noble metal, such as platinum or palladium. The presence of the noble metal in the outer layers of a reactor core component places the noble metal at the component-water interface, where it serves as a catalyst to promote recombination of hydrogen and oxygen, and thus lowers the concentration of both, in the reactor water. As a result, the electrochemical potential is lowered in the reactor system, which promotes resistance to stress corrosion cracking of reactor plant materials, including stainless steels and nickel-chromium alloys such as Inconel, and corrosion of core materials. In accordance with this invention, the use of a noble metal in a core component alloy is made technologically feasible because the noble metal is present only in the outer layers, instead of present throughout the alloy as would be required in the prior art.

A significant advantage of this invention is that the composite component exhibits reduced susceptibility to dimensional distortions due to irradiation growth as a result of the inner core being formed from a zirconium alloy that is characterized by a heightened resistance to irradiation growth as compared to other zirconium alloys. To compensate for the relatively inferior corrosion resistance of the inner core alloy, the inner core is clad with the outer layers formed of a more corrosion-resistant zirconium alloy, which is preferably processed to enhance its corrosion resistance, such that the alloys are combined in a manner that exploits their individual desirable properties. Finally, the outer layers are metallurgically bonded to the inner core to yield a composite strip, which is then formed to produce a composite reactor core component whose structural and environmental properties are greatly enhanced as compared to prior art reactor core components.

Other objects and advantages of this invention will be better appreciated from the following detailed description.

BRIEF DESCRIPTION OF THE DRAWINGS

The above and other advantages of this invention will become more apparent from the following description taken in conjunction with the accompanying Figure, which is a perspective view in partial cross-section of fuel assemblies for a boiling water reactor core.

DETAILED DESCRIPTION OF THE INVENTION

Figure 1:
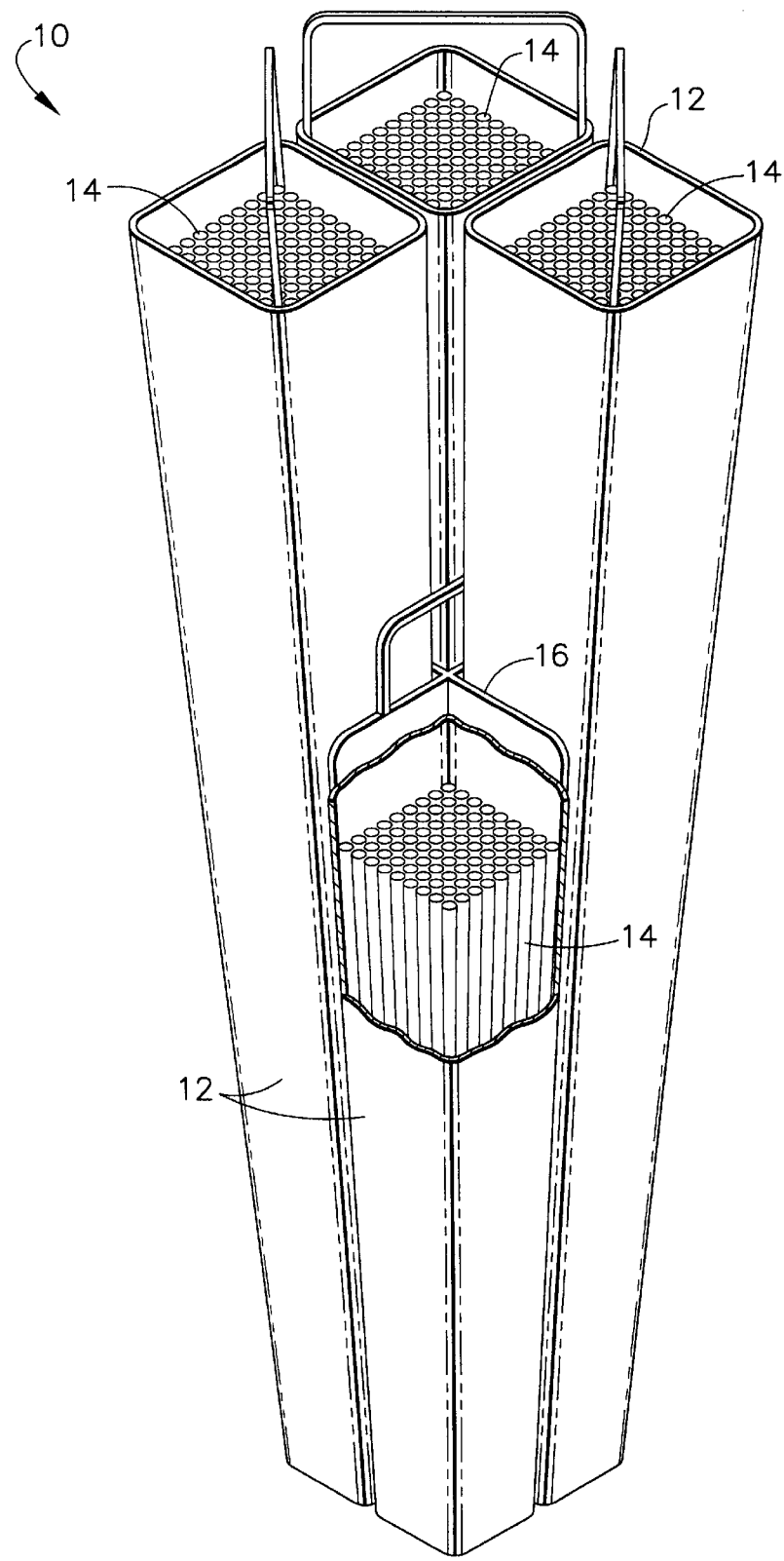

The present invention provides a composite component formed from different zirconium alloys that, in combination, promote the service life of the component in a nuclear reactor core environment by reducing the components susceptibility to irradiation growth and maintaining or improving its corrosion resistance. While being particularly applicable to fuel channels of boiling water reactors, this invention can also be applied to other zirconium-based alloy components employed within a nuclear reactor environment.

Represented in FIG. 1 is a fuel assembly 10 for a boiling water reactor (BWR) of a type known in the art. The assembly 10 is shown to include fuel channels 12 containing bundles of fuel rods 14, with X-shaped control rods 16 between adjacent channels 12. The fuel channels 12 are necessarily formed from an alloy having a low absorption cross section to thermal neutrons, so as to reduce the parasitic absorption of neutrons within the reactor core. Zirconium-based alloys are widely used as the material for fuel channels, as well as other components employed within reactor cores, due to zirconiums low neutron absorption, adequate strength at reactor temperatures, and resistance to interaction with water in the reactor environment.

The fuel channels 12 shown in the Figure are hollow elongated components having generally square-shaped cross-sections. Typically, the channels 12 are formed by rolling strips of a zirconium-based alloy, such as a Zircaloy alloy, bending the strips into U-shaped channel sections, and then seam welding two channel sections together to form a single fuel channel. The fuel channels 12 also serve to confine the coolant water flow through the core to a predictable flow path around the fuel rods 14. In a boiling water reactor, the coolant water is turned to steam by the heat released during fission. Accordingly, the fuel channels 12 of a boiling water reactor are exposed to a hostile corrosive and radiation environment.

According to this invention, a composite strip material is provided by which reactor core components, and particularly fuel channels employed in boiling water reactors, are able to exhibit enhanced resistance to corrosion when exposed to water and steam at high temperatures, and enhanced resistance to dimensional distortions, particularly longitudinal bow, due to irradiation growth. The channel strip material of this invention is composed of different zirconium-based alloys, one of which is characterized by desirable corrosion resistance, while the other is characterized by a reduced propensity for irradiation growth. The alloys are combined in a manner that exploits the respective corrosion and irradiation-resistance properties of the alloys.

More specifically, this invention entails forming a channel 12 from a composite strip having an inner core and two oppositely-disposed outer layers that are metallurgically bonded to the inner core. The inner core alloy is chosen on the basis of its ability to promote the channels resistance to irradiation growth, while the outer layer alloy is chosen for its ability to maintain or enhance the channels resistance to corrosion. Preferably, the inner core has a thickness greater than the outer layers combined. For example, a composite strip having a nominal thickness of about 2.5 millimeters could have an inner core of about 2.3 millimeters and outer layers of about 0.1 millimeter each, or an inner core of about 2 millimeters and outer layers of about 0.25 millimeter each.

While it is foreseeable that various alloys could be employed or developed, a preferred alloy for the inner core is the NSF zirconium alloy tested by the General Electric Company. Advantageously, the NSF alloy exhibits both enhanced resistance to irradiation growth and creep, the latter also being an important property for fuel channels. The NSF alloy has a composition, in weight percent, of about 0.6 to about 1.0 niobium, about 0.5 to about 1.0 tin, and about 0.2 to about 0.5 iron, with the balance essentially zirconium and incidental impurities. A particularly preferred composition is, in weight percent, about 1 niobium, about 1 tin, and about 0.3 iron, with the balance being essentially zirconium.

In contrast, the outer layers can be formed from a corrosion resistant alloy such as Zircaloy-2, having a composition, in weight percent, of about 1.2 to about 1.7 tin, about 0.10 to about 0.18 iron, about 0.08 to about 0.12 chromium, about 0.04 to about 0.08 nickel, about 0.04 to about 0.14 silicon, and about 0.08 to about 0.14 oxygen, with the balance zirconium and incidental impurities. A preferred Zircaloy-2 composition for the outer layers is, in weight percent, about 1.2 tin, about 0.18 iron, about 0.10 chromium, about 0.07 nickel, about 0.1 silicon, and about 0.10 oxygen, with the balance being essentially zirconium. Since creep is generally not a significant concern, a lower tin content, such as about 0.5 to about 1.2 weight percent, can be present in the alloy for the outer layers. Furthermore, higher levels of iron and nickel could be used, with suitable compositional ranges for an alloy of this type being about 0.5 to about 1.5 tin, about 0.18 to about 0.30 iron, about 0.08 to about 0.12 chromium, about 0.05 to about 0.15 nickel, about 0.04 to about 0.14 silicon, and about 0.08 to about 0.14 oxygen, the balance zirconium and incidental impurities.

In view of the above, a general alloy range for the outer layers is, in weight percent, about 0.05 to about 1.7 tin, about 0.10 to about 0.3 iron, about 0.08 to about 0.12 chromium, about 0.04 to about 0.15 nickel, about 0.04 to about 0.14 silicon, and about 0.08 to about 0.14 oxygen, with the balance essentially zirconium. A preferred composition for the outer layers of this invention is, in weight percent, about 1.0 tin, about 0.25 iron, about 0.10 chromium, about 0.05 nickel, about 0.10 silicon, and about 0.10 oxygen, the balance essentially zirconium.

The composition of the outer layers may also be alloyed to further include, in weight percent, about 0.02 to about 0.2 of a noble metal, such as platinum or palladium. A noble metal in the outer layers serves as a catalyst favoring the recombination of hydrogen and oxygen. As such, when the channel 12 is exposed to the water coolant of a boiling water reactor, the noble metal serves to lower the concentration of hydrogen and oxygen in the water, and thereby lowers the electrochemical potential in the water to further promote the core zirconium alloys resistance to corrosion and promote resistance to stress corrosion cracking of the nickel and iron-based alloys employed in the reactor plant.

Preferably, the outer layer alloy of this invention undergoes a fabrication process by which the desired mechanical and corrosion-resistance properties of the channel 12 are further promoted. Specifically, the outer layer alloy is preferably processed to have a corrosion-resistant microstructure using standard industry practices, such as quenching the outer layer material from a temperature above about 900° C., followed by standard cold working and recrystallization steps to achieve a desired final strip size.

After forming strips of the inner core and outer layers materials, the outer layer strips are metallurgically bonded to the inner core strip using methods well known in the metal fabrication industry. Preferably, the composite structure of the resulting channel strip is formed by cold or hot roll-bonding the thin outer layers to the inner core. Because both the inner core and outer layer alloys are more than 97% zirconium, a metallurgical bond can be achieved by roll bonding at temperatures below about 650° C., and preferably below about 200° C. Other possible bonding techniques include co-extrusion below about 750° C. or a combination of HIP-ing (hot isostatic pressing), hot rolling and cold rolling, in accordance with practices known in the art. Following the bonding step, the composite channel strip can then be formed and joined, such as by welding, to form a channel.

In view of the above, it can be appreciated that a significant advantage of this invention is that the disclosed composite fuel channel will perform exceptionally well in the environment of a nuclear reactor core, and particularly a boiling water reactor. Specifically, such channels exhibit improved resistance to longitudinal bow, creep and corrosion because the inner core is formed from an alloy that exhibits a reduced propensity for irradiation growth and enhanced creep resistance as compared to the outer layer alloy, and the outer layer is formed from an alloy that exhibits enhanced corrosion resistance as compared to the inner core alloy. As such, the present invention combines two different alloys in a manner that exploits their individual desirable properties.

While the invention has been described in terms of a preferred embodiment, it is apparent that other forms could be adopted by one skilled in the art. For example, a component may be structured so as to require only a single cladding layer that is metallurgically bonded to a core alloy, instead of the two outer layers described in accordance with the preferred embodiment of this invention. In addition, it is foreseeable that other alloys could be employed as the inner core and cladding layer materials which would yield the object of this invention—namely, the core alloy being characterized by a reduced propensity for irradiation growth as compared to the cladding layer alloy, and the cladding layer alloy being characterized by enhanced corrosion resistance as compared to the core alloy. Therefore, the scope of the invention is to be limited only by the following claims.

The embodiments of the invention in which an exclusive property or privilege is claimed are defined as follows:

1. A nuclear reactor component having an inner core and at least one cladding layer metallurgically bonded to the inner core, the inner core and the cladding layer being formed from first and second alloys having different compositions, the first alloy being characterized by a reduced propensity for irradiation growth as compared to the second alloy, the second alloy being characterized by enhanced corrosion resistance as compared to the first alloy, wherein the inner core and the cladding layer are combined such that the irradiation resistance and the corrosion resistance of the nuclear reactor component are effected by the first alloy and the second alloy, respectively.

2. A nuclear reactor component as recited in claim 1 wherein the first alloy has a composition of, in weight percent, about 0.5 to about 1.0 tin, about 0.6 to about 1.0 niobium, and about 0.2 to about 0.5 iron, with the balance essentially zirconium and incidental impurities.

3. A nuclear reactor component as recited in claim 1 wherein the second alloy has a composition of, in weight percent, about 0.5 to about 1.7 tin, about 0.1 0 to about 0.30 iron, about 0.08 to about 0.12 chromium, about 0.04 to about 0.15 nickel, about 0.04 to about 0.14 silicon, about 0.08 to about 0.14 oxygen, with the balance zirconium and incidental impurities.

4. A nuclear reactor component as recited in claim 1 wherein the second alloy has a composition of, in weight percent, about 1.2 to about 1.7 tin, about 0.10 to about 0.18 iron, about 0.08 to about 0.12 chromium, about 0.04 to about 0.08 nickel, about 0.04 to about 0.14 silicon, and about 0.08 to about 0.14 oxygen, with the balance essentially zirconium.

5. A nuclear reactor component as recited in claim 1 wherein the second alloy has a composition of, in weight percent, about 0.5 to about 1.2 tin, about 0.10 to about 0.18 iron, about 0.08 to about 0.12 chromium, about 0.04 to about 0.08 nickel, about 0.04 to about 0.14 silicon, and about 0.08 to about 0.14 oxygen, with the balance essentially zirconium.

6. A nuclear reactor component as recited in claim 1 wherein the second alloy has a composition of, in weight percent, about 0.5 to about 1.5 tin, about 0.18 to about 0.30 iron, about 0.08 to about 0.12 chromium, about 0.05 to about 0.15 nickel, about 0.04 to about 0.14 silicon, about 0.08 to about 0.14 oxygen, with the balance essentially zirconium.

7. A nuclear reactor component as recited in claim 1 wherein the second alloy has a composition of, in weight percent, about 1.0 tin, about 0.25 iron, about 0.10 chromium, about 0.05 nickel, about 0.10 silicon, and about 0.10 oxygen, with the balance essentially zirconium.

8. A nuclear reactor component as recited in claim 1 wherein the second alloy has a composition that includes, in weight percent, about 0.02 to about 0.02 of a noble metal.

9. A nuclear reactor component as recited in claim 1 wherein the nuclear reactor component is a boiling water reactor channel.

10. A boiling water reactor channel comprising an inner core and two oppositely-disposed outer layers metallurgically bonded to the inner core, the inner core having a thickness greater than the outer layers combined, the inner core having a composition of, in weight percent, about 0.5 to about 1.0 tin, about 0.6 to about 1.0 niobium, and about 0.2 to about 0.5 iron, with the balance essentially zirconium and incidental impurities, each of the outer layers having a composition of, in weight percent, about 0.5 to about 1.7 tin, about 0.10 to about 0.30 iron, about 0.08 to about 0.12 chromium, about 0.04 to about 0.15 nickel, up to about 0.14 silicon, and up to about 0.14 oxygen, with the balance zirconium and incidental impurities.

11. A boiling water reactor channel as recited in claim 10 wherein each of the outer layers has a composition of, in weight percent, about 0.5 to about 1.2 tin, about 0.10 to about 0.18 iron, about 0.08 to about 0.12 chromium, about 0.04 to about 0.08 nickel, about 0.04 to about 0.14 silicon, and about 0.08 to about 0.14 oxygen, with the balance essentially zirconium.

12. A boiling water reactor channel as recited in claim 10 wherein each of the outer layers has a composition of, in weight percent, about 0.5 to about 1.5 tin, about 0.18 to about 0.30 iron, about 0.08 to about 0.12 chromium, about 0.05 to about 0.15 nickel, about 0.04 to about 0.14 silicon, about 0.08 to about 0.14 oxygen, with the balance essentially zirconium.

13. A boiling water reactor channel as recited in claim 10 wherein each of the outer layers has a composition of, in weight percent, about 1.0 tin, about 0.25 iron, about 0.10 chromium, about 0.05 nickel, about 0.10 silicon, and about 0.10 oxygen, with the balance essentially zirconium.

14. A boiling water reactor channel as recited in claim 10 wherein each of the outer layers has a composition that further includes, in weight percent, about 0.02 to about 0.2 of a noble metal.

15. A method for fabricating a nuclear reactor component, the method comprising the steps of:

forming an inner core strip and an outer layer strip from first and second alloys, respectively, of different compositions, the first alloy being characterized by a reduced propensity for irradiation growth as compared to the second alloy, the second alloy being characterized by enhanced corrosion resistance as compared to the first alloy;

metallurgically-bonding the outer layer strip to a surface of the inner core strip to form a composite strip; and deforming the composite strip to form the nuclear reactor component.

16. A method as recited in claim 15 wherein the inner core strip has a composition of, in weight percent, about 0.5 to about 1.0 tin, about 0.6 to about 1.0 niobium, and about 0.2 to about 0.5 iron, with the balance essentially zirconium and incidental impurities, and wherein the outer layer strip has a composition of, in weight percent, about 0.5 to about 1.7 tin, about 0.10 to about 0.30 iron, about 0.08 to about 0.12 chromium, about 0.04 to about 0.15 nickel, about 0.04 to about 0.14 silicon, about 0.08 to about 0.14 oxygen, with the balance zirconium and incidental impurities.

17. A method as recited in claim 15 wherein the outer layer strip has a composition of, in weight percent, about 0.5 to about 1.2 tin, about 0.10 to about 0.18 iron, about 0.08 to about 0.12 chromium, about 0.04 to about 0.08 nickel, about 0.04 to about 0.14 silicon, and about 0.08 to about 0.14 oxygen, with the balance essentially zirconium.

18. A method as recited in claim 15 wherein the outer layer strip has a composition of, in weight percent, about 0.5 to about 1.5 tin, about 0.18 to about 0.30 iron, about 0.08 to about 0.12 chromium, about 0.05 to about 0.15 nickel, about 0.04 to about 0.14 silicon, about 0.08 to about 0.14 oxygen, with the balance essentially zirconium.

19. A method as recited in claim 15 wherein the outer layer strip has a composition of, in weight percent, about 1.0 tin, about 0.25 iron, about 0.10 chromium, about 0.05 nickel, about 0.10 silicon, and about 0.10 oxygen, with the balance essentially zirconium.

20. A method as recited in claim 15 wherein the outer layer strip has a composition that further includes, in weight percent, about 0.02 to about 0.2 of a noble metal.

* * * * *